(12) United States Patent  
Hatsuda et al.

(10) Patent No.: US 7,195,087 B2
(45) Date of Patent: Mar. 27, 2007

(54) DRIVE APPARATUS FOR VEHICLE

(75) Inventors: Tadayuki Hatsuda, Fujisawa (JP); Tetsuya Niikuni, Yokosuka (JP); Tsutomu Tanimoto, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 234 days.

(21) Appl. No.: 10/816,892

(22) Filed: Apr. 5, 2004

(65) Prior Publication Data

US 2004/0200654 A1 Oct. 14, 2004

(30) Foreign Application Priority Data

Apr. 9, 2003 (JP) .............................. 2003-105647
Apr. 1, 2004 (JP) .............................. 2004-109043

(51) Int. Cl.
*B60K 1/00* (2006.01)
(52) U.S. Cl. ..................................... 180/65.2; 180/65.5
(58) Field of Classification Search ............... 280/65.1, 280/65.2, 65.5, 65.6, 242, 243, 233
See application file for complete search history.

(56) References Cited

U.S. PATENT DOCUMENTS

| | | | | |
|---|---|---|---|---|
| 3,799,284 | A * | 3/1974 | Hender ...................... | 180/65.2 |
| 3,970,160 | A * | 7/1976 | Nowick ..................... | 180/6.5 |
| 5,382,854 | A * | 1/1995 | Kawamoto et al. ....... | 310/67 R |
| 5,489,831 | A * | 2/1996 | Harris ........................ | 318/701 |
| 5,960,897 | A | 10/1999 | Furuya et al. | |
| 6,019,183 | A * | 2/2000 | Shimasaki et al. ......... | 180/165 |
| 6,089,341 | A * | 7/2000 | Gingerich .................. | 180/65.1 |
| 6,449,552 | B2 * | 9/2002 | Ohba et al. ................ | 701/89 |
| 6,549,835 | B2 * | 4/2003 | Deguchi et al. ............. | 701/41 |
| 6,573,675 | B2 * | 6/2003 | Schmitz et al. ............. | 318/434 |
| 6,622,804 | B2 * | 9/2003 | Schmitz et al. ............ | 180/65.2 |
| 6,688,412 | B2 * | 2/2004 | Kima et al. ................. | 180/65.5 |
| 6,717,281 | B1 * | 4/2004 | Brandon et al. ........... | 290/40 C |
| 2002/0023791 | A1 * | 2/2002 | Kima et al. | |

(Continued)

FOREIGN PATENT DOCUMENTS

EP 0493848 7/1992

(Continued)

OTHER PUBLICATIONS

Satoru Chujyou et al.; Publication No. VT-02-06; "e-4WD System"; Nissan Motor Co., Ltd..; Dec. 6, 2002.

*Primary Examiner*—Christopher Bottorff
(74) *Attorney, Agent, or Firm*—Global IP Counselors

(57) ABSTRACT

A drive apparatus basically comprises left and right drive units each including at least a reduction gear, an electric motor without a permanent magnet, and a brake disc. Each of the left and right drive units is housed substantially within a rim of each of rear wheels which are driven wheels. A 4WD control unit is configured to control a pair of inverters to separately drive the electric motors when a vehicle speed is in a range between a standing start speed and a prescribed vehicle speed, and to stop driving the electric motors when the vehicle speed is equal to or greater than the prescribed vehicle speed to place the rear wheels in a driven state. Accordingly, a friction loss due to a cogging torque encountered in a conventional permanent magnet-type motor is eliminated, and a lightweight drive apparatus is obtained. Fuel efficiently is accordingly improved.

13 Claims, 12 Drawing Sheets

U.S. PATENT DOCUMENTS

2002/0039459 A1* 4/2002 Niwa et al.
2003/0205422 A1* 11/2003 Morrow et al.

FOREIGN PATENT DOCUMENTS

| EP | 0752753 | 1/1997 |
| EP | 1219492 | 7/2002 |
| JP | 2000-264086 A | 9/2000 |

* cited by examiner

DRIVE APPARATUS FOR VEHICLE

BACKGROUND OF THE INVENTION

1. Field of the Invention

The present invention relates to a drive apparatus for a vehicle in which one pair of front or rear wheels are driven by a vehicle power train and the other pair of the front or rear wheels are driven by a pair of electric motors coupled to the other pair of the front or rear wheels.

2. Background Information

In a conventional four-wheel drive vehicle that only has an engine as a power train, a space for accommodating a propeller shaft extending from a transmission in the front of the vehicle to the rear wheels is required. Therefore, in the conventional four-wheel drive vehicle, a propeller shaft tunnel is provided at a substantially widthwise center portion of a floor of the vehicle under the rear seats. In such a case, the floor is not level, and thus, comfort for the passengers is reduced. Also, another type of conventional four-wheel drive vehicle includes an arrangement in which the driven wheels are disengaged with an electromagnetic clutch or the like when four-wheel drive is not required. In other words, in this type of the conventional four-wheel drive vehicle, the driven wheels are disengaged from the power train and driven by the drive wheels during two-wheel drive mode. This type of conventional four-wheel drive vehicle has had problems in that the propeller shaft, a differential gear and the like continue to be rotated due to the forced rotation of the driven wheels during two-wheel drive mode. Therefore, fuel efficiency decreases in proportion to the friction of the propeller shaft and the differential gear.

In recent years, hybrid four-wheel drive vehicles (hereinafter referred to as hybrid 4WD vehicles) have been developed to solve some of the above mentioned problems of the conventional four-wheel drive vehicles. For example, Satoshi Chujo, et al., "Institute of Electrical Engineers, Technical Meeting on Vehicle Technology, Proceedings: 42 V Automobile Power Source Systems and Related Technology" (Dec. 6, 2002), publication No. VT-02-06 "e-4WD System" discloses a hybrid 4WD vehicle in which the front wheels are driven by an engine and the rear wheels are driven by an electric motor such as a DC motor. In this reference, the engine is also configured and arranged to drive a power generator at low to medium vehicle speeds. The hybrid 4WD vehicle disclosed in the above mentioned reference performs four-wheel drive using the engine and the DC motor with the power generated by the power generator when the vehicle starts moving or when the front wheels spin. When the engine is operating under other conditions, front-wheel drive (i.e., two-wheel drive) is performed using the engine alone.

In the hybrid 4WD vehicle disclosed in the above mentioned reference, the drive force of the DC motor is transmitted to the differential gear of the rear wheels via a reduction gear and an electromagnetic clutch, and the drive force is then distributed to the left and right rear wheels by the differential gear. When the hybrid 4WD vehicle disclosed in the above mentioned reference is driven in a two-wheel drive mode in which the drive force is generated by the engine alone, the torque-transmitting connections between the DC motor and the drive axles of the rear wheels (i.e., the driven wheels) are disengaged by the electromagnetic clutch to prevent the DC motor from idling with the rotation of the driven wheels.

Also in the hybrid 4WD vehicle disclosed in the above mentioned reference, most of the rear drive components such as the electrical wiring, the DC motor, the reduction gear, the electromagnetic clutch, the differential gear, and other components are disposed under the rear trunk. Therefore, the only difference between the hybrid 4WD vehicle disclosed in the above reference and a conventional front drive 2WD vehicle is that the height of the trunk bottom is slightly higher in the hybrid 4WD vehicle. Thus, with the hybrid 4WD vehicle disclosed in the above mentioned reference, there is almost no adverse affect on passengers' comfort in the rear seats. Accordingly, the hybrid 4WD vehicle disclosed in the above mentioned reference achieves four-wheel drive while the fuel consumption is kept lower than the conventional four-wheel drive vehicle in which the engine is the only drive source. Therefore, in the hybrid 4WD vehicle disclosed in the above mentioned reference, the vehicle weight is reduced due to the absence of a propeller shaft. Moreover, there is no idling friction in the propeller shaft, differential gear, and the like when the vehicle is in the two-wheel drive mode.

In view of the above, it will be apparent to those skilled in the art from this disclosure that there exists a need for a drive apparatus for vehicle. This invention addresses this need in the art as well as other needs, which will become apparent to those skilled in the art from this disclosure.

SUMMARY OF THE INVENTION

However, the hybrid 4WD vehicle disclosed in the above mentioned reference still utilizes a differential gear, an electromagnetic clutch, and other mechanical components for the wheels driven by the electric motor. Therefore, the weight of the vehicle cannot be reduced, which has been a hindrance to further improvement in fuel efficiency.

Furthermore, since the electric power is supplied to a rotor coil of the DC motor by brush contact, the DC motor has a relatively large amount of friction during idling. Therefore, it has been necessary to disengage the DC motor with the electromagnetic clutch to prevent the DC motor from idling with the slave rotation of the rear wheels during two wheel drive mode in which only the front wheels are driven in by the engine alone. Also, in the hybrid 4WD vehicle disclosed in the above mentioned reference, the differential gear has been indispensable for distributing the drive force of the DC motor to the left and right rear wheels.

In order to solve the above mentioned problems of the conventional four-wheel drive vehicles and hybrid 4WD vehicles, one object of the present invention is to provide a drive apparatus for a vehicle that achieves a vehicle that is lightweight, that has a simpler drive unit construction, and that suffers minimal idling-induced friction loss even when the driven wheels are driven by the drive wheels.

In order to achieve the above identified and other objects, a drive apparatus for a vehicle basically comprises a first drive unit and a second drive unit. The first drive unit includes at least a first non-permanent magnet electric motor configured and arranged to drive a first wheel, and a first reduction gear operatively coupled to the first non-permanent magnet electric motor to reduce speed of the first non-permanent magnet electric motor. The second drive unit including at least a second non-permanent magnet electric motor configured and arranged to drive a second wheel disposed on an opposite side of the vehicle from the first wheel, and a second reduction gear operatively coupled to the second non-permanent magnet electric motor to reduce speed of the second non-permanent magnet electric motor.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
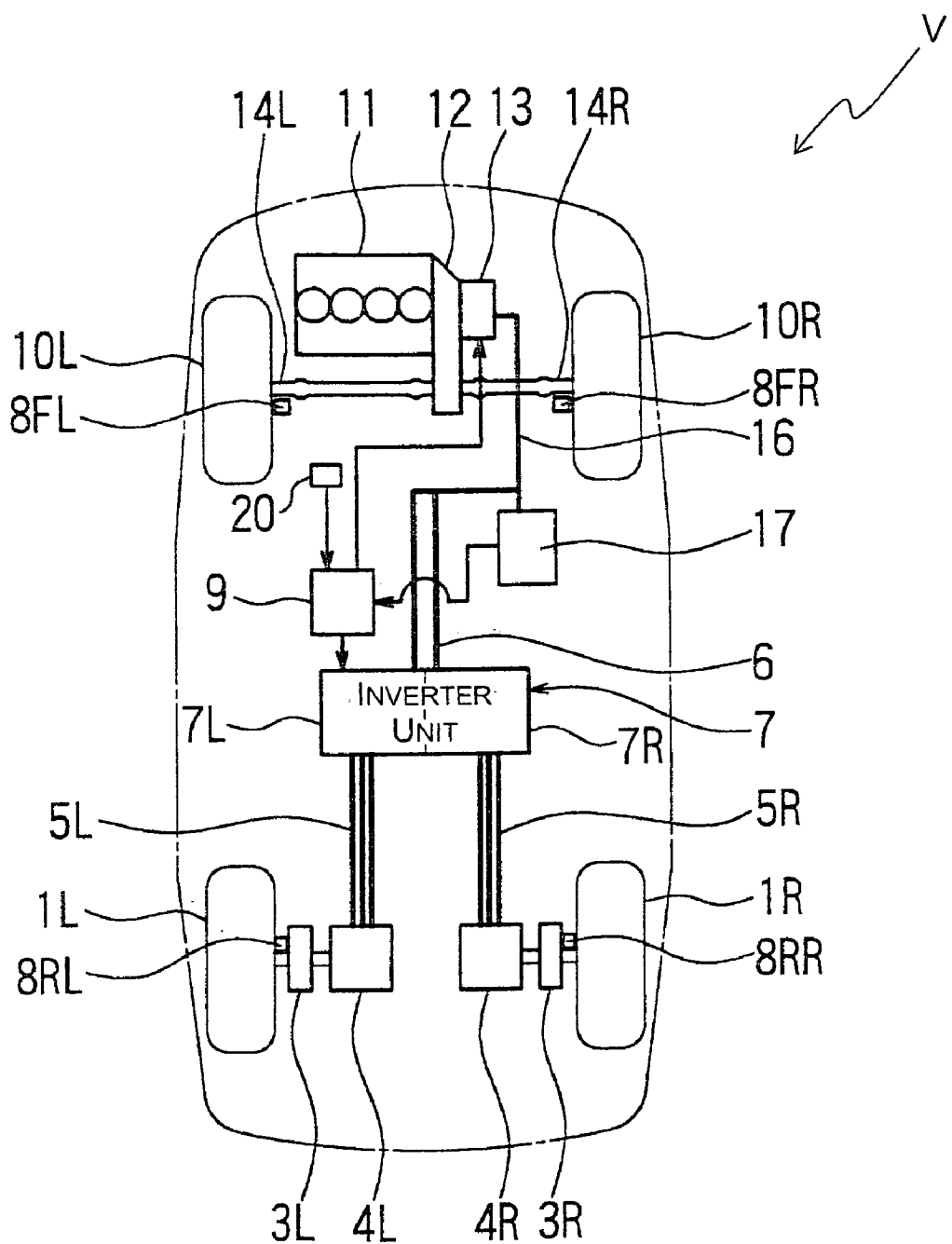
FIG. 1 is a simplified schematic view of an overall drive control system of a hybrid 4WD vehicle equipped with a drive apparatus in accordance with a first embodiment of the present invention.
Figure 2:
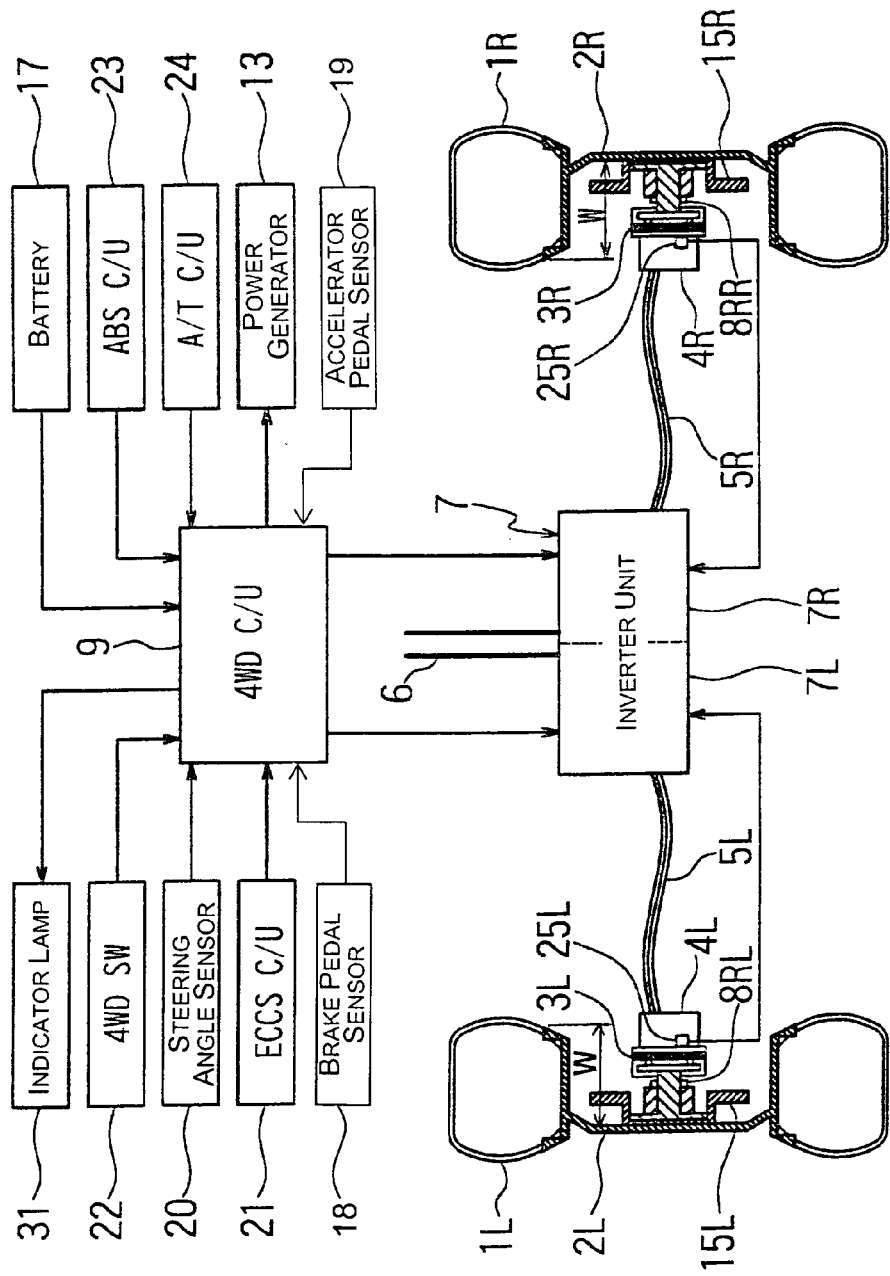
FIG. 2 is a schematic view of the drive apparatus illustrated in FIG. 1 including a drive control system of left and right rear wheels of the hybrid 4WD vehicle in accordance with the first embodiment of the present invention.

Referring initially to FIGS. 1 to 8, a drive apparatus is illustrated in accordance with a first embodiment of the present invention. FIG. 1 is a simplified schematic view of an overall drive control system of a hybrid four-wheel drive vehicle V equipped with the drive apparatus of the first embodiment. FIG. 2 is a schematic view of the drive apparatus illustrated in FIG. 1 including a drive control system of a first or left rear wheel 1L and a second or right rear wheel 1R of the hybrid four-wheel drive vehicle V. Hereinafter "four-wheel drive" is abbreviated as "4WD", and "two-wheel drive" is abbreviated as "2WD".

As seen in FIG. 1, the vehicle V has an engine 11 that is a power-generating internal combustion engine or power source of a power train. The engine 11 is mechanically coupled to a power generator 13 for drive the power generating 13 to generate DC electric power. The engine 11 is also configured and arranged to drive a pair of left and right front wheels 10L and 10R using part of a power train that is a transmission 12 with an integrated with a clutch and a pair of left and right front wheel drive shafts 14L and 14R. The front wheels 10 and 10R are provided with a pair of left and right wheel speed sensors 8FL and 8FR for detecting the rotational speeds of the front wheels 10L and 10R, respectively.

As shown in FIG. 2, a pair of left and right reduction gears 3L and 3R, a pair of left and right non-permanent magnet electric motors 4L and 4R, and a pair of left and right brake discs 15L and 15R are housed substantially within the left and right rims 2L and 2R of the rear wheels 1L and 1R, respectively. The reduction gears 3L and 3R and the electric motors 4L and 4R are shown as being disposed outside of the rear wheels 1L and 1R in FIG. 1 to better understand the connection relationship between these components for the illustration purpose only.

In other words, the diameters of the reduction gears 3L and 3R and electric motors 4L and 4R are preferably small enough to fit in the rims 2L and 2R, respectively. The reduction gear 3L and the electric motor 4L are integrally assembled to constitute a first or left drive unit together with the brake disc 15L and a wheel speed sensor 8RL for detecting the rotational speed of the rear wheel 1L. Similarly, the reduction gear 3R and the electric motor 4R are integrally assembled to constitute a second or right drive unit together with the brake disc 15R and a wheel speed sensor 8RR for detecting the rotational speed of the rear wheel 1R. As seen in FIG. 2, most of the axial lengths of the electric motors 4L and 4R fit within the widths W of the rims 2L and 2R, respectively. Accordingly, a compact configuration of each of the left and right drive units is incorporated in a corresponding one of the rims 2L and 2R. The wheel speed sensors 8RL and 8RR together preferably constitute a speed sensor unit that is configured to detect the speeds of the rear wheels 1L and 1R.

Each of the reduction gears 3L and 3R is preferably a planetary reduction gear. An output shaft of the electric motors 4L, an input shaft and an output shaft of the reduction gear 3L, and a rotation shaft of the brake disc 15L are preferably arranged to be substantially coincident. Likewise, an output shaft of the electric motors 4R, an input shaft and an output shaft of the reduction gear 3R, and a rotation shaft of the brake disc 15R are preferably arranged to be substantially coincident.

The reduction gears 3L and 3R and the electric motors 4L and 4R are non-rotatably fixed to an axle (not shown) of the hybrid 4WD vehicle V so that the outputs from the reduction gears 3L and 3R are transmitted to the rims 2L and 2R via the brake discs 15L and 15R, respectively. The transmission gear ratio of each of the reduction gears 3L and 3R is preferably set such that speeds of the electric motors 4L and 4R are about 10,000 rpm when the speed of the hybrid 4WD vehicle V is about 50 km/hr. Of course, if will be apparent to those skilled in the art from this disclosure that the transmission gear ratio of each of the reduction gears 3L and 3R is can be varied and is not limited to the above mentioned ratio.

Each of the electric motors 4L and 4R is preferably a switched reluctance motor (hereinafter referred to as an SR motor). As seen in FIG. 2, the electric motors 4L and 4R are preferably provided with left and right rotation angle sensors 25L and 25R, respectively.

As seen in FIG. 1, the power generator 13 is electrically coupled to a battery 17 via a power cable 16. The power generator 13 is configured and arranged to charge the battery 17. Also, the DC current of the power generator 13 or the battery 17 is supplied to an inverter unit 7 via a power cable 6 connected to the power cable 16. Furthermore, the electric motors 4L and 4R are electrically connected to the battery 17 to change the battery 17 during braking as explained below.

In the first embodiment of the present invention, the inverter unit 7 preferably includes first and second inverters or left and right inverters 7L and 7R. Moreover, the inverters 7L and 7R of the inverter unit 7 are configured to separately supply electric power to the electric motors 4L and 4R via left and right power cables 5L and 5R, respectively.

Figure 3:
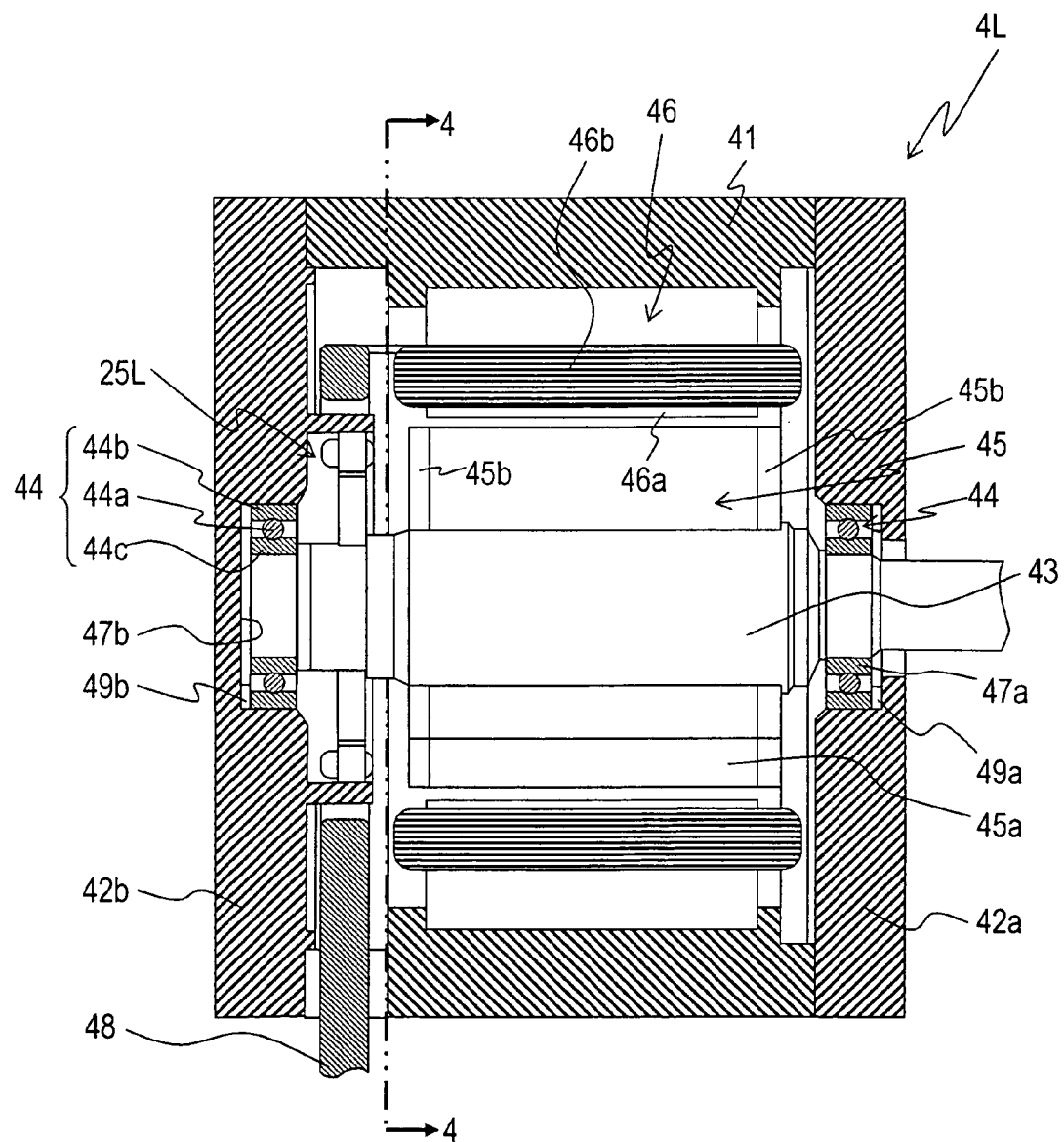
FIG. 3 is an axial cross-sectional view of an SR motor utilized in the drive apparatus in accordance with the first embodiment of the present invention.
Figure 4:
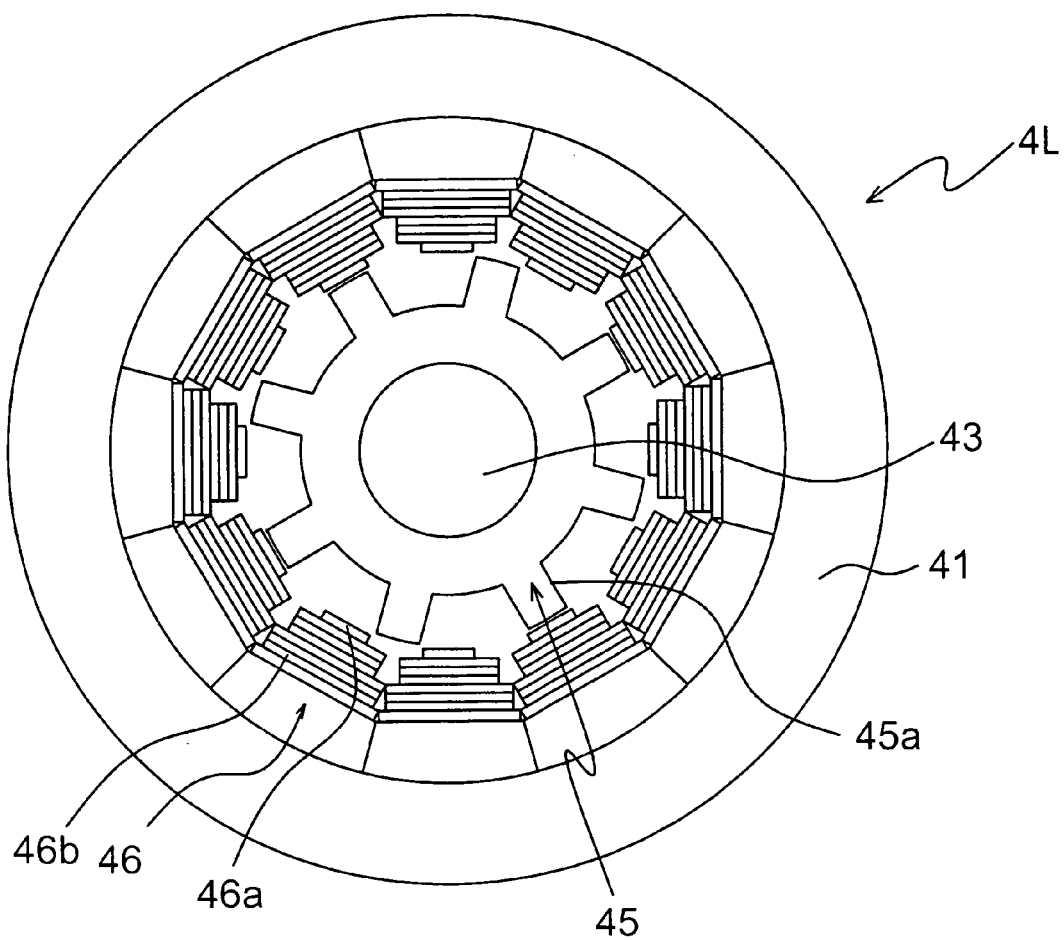
FIG. 4 is a partial cross-sectional view of the SR motor as viewed along a section line 4—4 in FIG. 3.

Referring now to FIGS. 3 and 4, the structure and configuration of the electric motors 4L and 4R (i.e., the SR motors) of the first embodiment will now be described based on FIGS. 3 and 4. Since the electric motors 4L and 4R are basically identical, only the electric motor 4L will be explained in detail herein. FIG. 3 is an axial cross-sectional view along the rotational axis of the electric motor 4L, and FIG. 4 is a transverse cross-sectional view of the electric motor 4L as viewed along the section line 4—4 in FIG. 3.

The electric motor 4L is preferably a so-called 12/8-pole type SR motor wherein a stator 46 has twelve salient poles 46a, and a rotor 45 has eight salient poles 45a. The stator 46 is formed by dividing each pole into twelve poles, and aligning and shrink-fitting the twelve poles around inside of a cylindrical steel frame 41, as shown in FIG. 4. Each pole of the stator 46 comprises a base whose outer side constitutes an arc 1/12th of the inner circumference of the stator 46 and a plurality of thin magnetic steel plates with a thickness of about 0.5 mm or less (e.g., 0.35 mm or 0.2 mm) stacked in the axial direction of the electric motor 4L to form a substantially rectangular shape salient pole 46a extending inwardly from the base. A coil 46b is wounded around each of the salient poles 46a in a substantially rectangular shape in cross section as seen in FIG. 4. The coils 46b are wound to form a U-phase coil, a v-phase coil and a W-phase coil that are intermittently subjected to the flow of current through their in a constant direction. The current in the coils 46b are selectively controlled for either acting as a motor or a generator as discussed below.

The rotor 45 is formed by stacking a plurality of thin magnetic steel plates with a thickness of about 0.5 mm or less (e.g., 0.35 mm or 0.2 mm) in the axial direction that are perforated with a press into a shape having a central hole for accommodating a motor axle 43 and eight substantially rectangular protrusions extending radially. The magnetic steel plates are compressed and held on both sides by a pair of nonmagnetic thick steel plate end rings 45b, and shrink-fitted on the motor axle 43. Therefore, the rotor 45 is formed as a substantially solid component. Since the magnetic steel plates used to form the rotor 45 are relatively thin, iron loss during high-speed rotation is reduced. Moreover, loosening in the radial end portions of the magnetic steel plates during shrink-fitting and high-speed rotation can be prevented because the magnetic steel plates of the rotor 45 are held in the axial direction on both sides by the end rings 45b.

As seen in FIG. 3, both axial sides of the frame 41 of the electric motor 4L are covered by an end plate 42a through which the motor axle 43 passes, and an end plate 42b through which the motor axle 43 does not pass. The axial ends of the motor axle 43 are supported by a pair of ball bearings 44 disposed in bearing seats 47a and 47b that are provided on the end plates 42a and 42b, respectively. A pressure washer 49b is disposed on the bearing seat 47b for applying pressure to the ball bearings 44 inwardly in the axial direction. A washer 49a is disposed on the bearing seat 47a. More specifically each of the ball bearings 44 includes a plurality of bearing balls 44a, an outer ring or race 44b and an inner ring or race 44c. The bearing balls 44 are preferably made of silicon nitride ceramic, and the outer ring 44b and inner ring 44c are preferably made of high carbon chromium steel.

An electric power supply bus bar 48 is disposed adjacent to the end plate 42b for the U, V, and W phases to the coils 46b. The bus bar 48 is connected to the coils 46b on each pole 46a of the stator 46. The rotation angle sensor 25L is coaxially disposed on the motor axle 43 adjacent to the end plate 42b side of the motor axle 43. The rotation angle sensor 25L is, for example, a resolver-type sensor.

Figure 5:
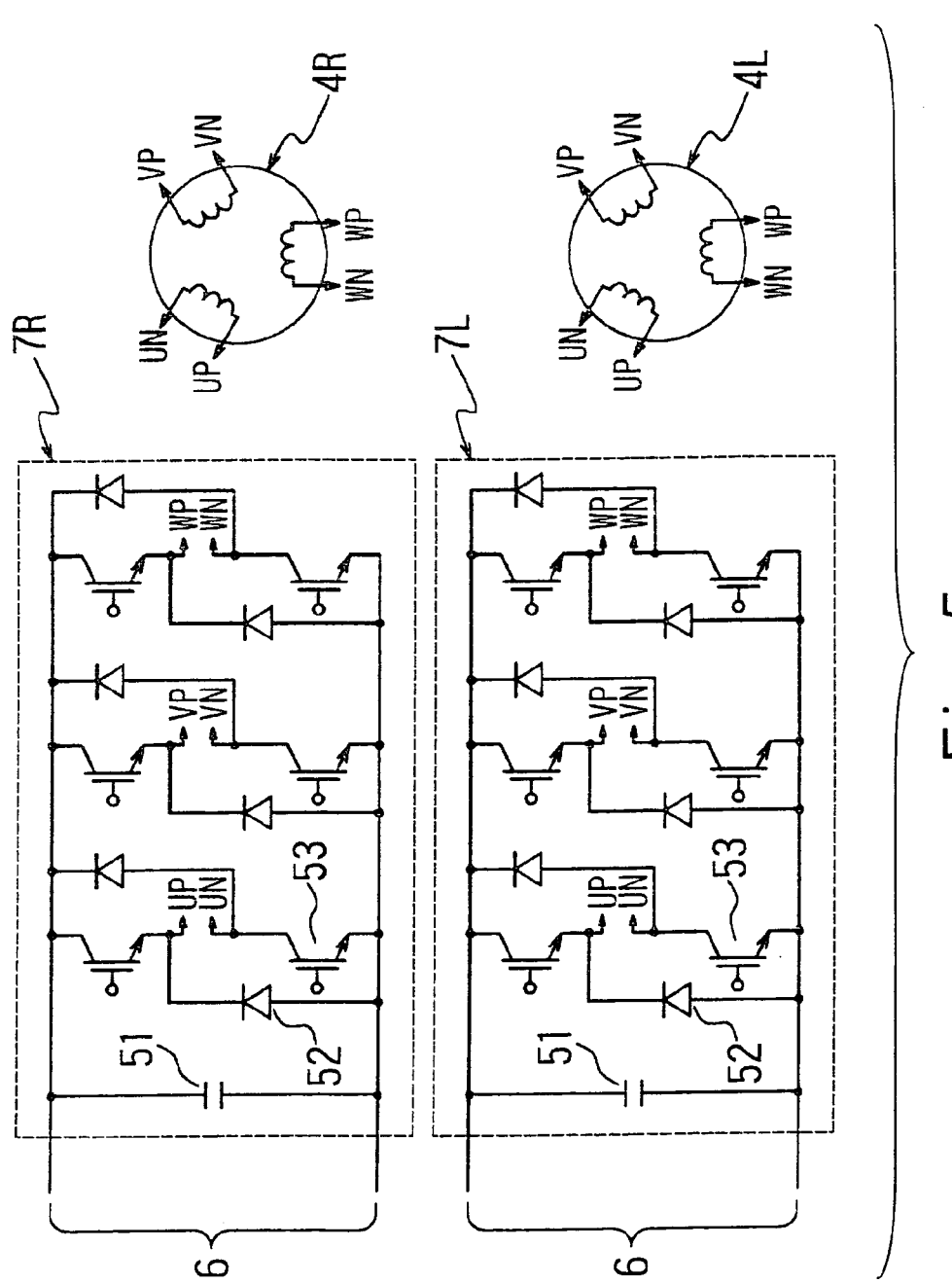
FIG. 5 is a schematic diagram of circuits included in an inverter unit utilized in the drive apparatus in accordance with the first embodiment of the present invention.

FIG. 5 is a schematic diagram switching of circuits of the inverters 7L and 7R of the inverter unit 7 used to selectively switch the conduction of the coils 46b in the electric motors 4L and 4R.

The inverter 7R of the inverter unit 7 is preferably provided with a common inverter circuit for SR motors that basically comprises an input capacitor 51 for absorbing the surge current generated by switching, a plurality of diodes 52, and a plurality of switching elements 53 such as IGBT. Emitter and collector terminals of the switching elements 53, marked as UP and UN in FIG. 5, are connected to terminals designated with the same symbols (UP and UN) in a U-phase coil 46b of the electric motor 4R shown in FIG. 5. The V-phase and W-phase coils are constructed and connected in the same manner as the U-phase coil. A circuit of the inverter 7L has an identical structure as the circuit of the inverter 7R, and the emitter and collector terminals of the switching elements 53 of the inverter 7L are connected to corresponding coils 46b of the electric motor 4L as in the inverter 7R and the electric motor 4R.

The inverters 7L and 7R of the inverter unit 7 are configured to control the DC current supplied via the power cable 6 and the flow of current through the U, V, and W phases of the coils 46b on the salient poles 46a of the stator 46 by switching the state of conduction of the switching elements 53 based on rotation angle signals detected by the rotation angle sensors 25L and 25R of the electric motors 4L and 4R, respectively. Therefore, in the first embodiment of the present invention, the inverters 7L and 7R are preferably configured to independently and separately control the rotations of the electric motors 4L and 4R, respectively.

Moreover, in the first embodiment of the present invention, the inverter unit 7 is also configured and arranged to function as a regenerative brake by using the electric motors 4L and 4R as power generators, converting the AC current to DC current, and charging the battery 17 via the power cable 6.

Referring back to FIG. 2, the control system of the drive apparatus of the hybrid 4WD vehicle V of the first embodiment will now be described.

As seen in FIG. 2, a 4WD control unit (4WD C/U) 9 is configured to coupled to the inverter unit 7 to control the inverters 7L and 7R. Also, the 4WD control unit 9 is coupled to the battery 17, and configured to detect the charging status of the battery 17. Then, the 4WD control unit 9 is configured to transmit signals for starting or stopping the power generator 13 depending on whether the hybrid 4WD vehicle V is operating in the 4WD or 2WD travel mode, and to control the power generator 13 accordingly.

The 4WD control unit 9 preferably includes a microcomputer with a control program that controls the drive apparatus of the present invention as discussed below. The 4WD control unit 9 can also include other conventional components such as an input interface circuit, an output interface circuit, and storage devices such as a ROM (Read Only Memory) device and a RAM (Random Access Memory) device. The microcomputer of the 4WD control unit 9 is programmed to control the drive apparatus. The memory circuit stores processing results and control programs that are run by the processor circuit. The 4WD control unit 9 is operatively coupled to various sensors in a conventional manner as discussed below. The internal RAM of the 4WD control unit 9 stores statuses of operational flags and various control data. The 4WD control unit 9 is capable of selectively controlling any of the components of the control system in accordance with the control program. It will be apparent to those skilled in the art from this disclosure that the precise structure and algorithms for the 4WD control unit 9 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Moreover, in order to perform 4WD control, the 4WD control unit 9 is preferably coupled to a brake pedal sensor 18, an accelerator pedal sensor 19, a steering angle sensor 20, an engine concentrated electronic control system/control unit (ECCS C/U; hereinafter referred to as ECCS control unit) 21, a 4WD selector switch (4WD SW) 22, an anti-lock braking system control unit (ABS C/U; hereinafter referred to as ABS control unit) 23, an automatic transaxle control unit (A/T C/U; hereinafter referred to as A/T control unit) 24, and an indicator lamp 31.

The brake pedal sensor 18 is configured and arranged to detect when a brake pedal has been depressed, and transmit a braking signal to the 4WD control unit 9. The accelerator pedal sensor 19 is configured and arranged to detect when an accelerator has been depressed, and transmit a throttle position signal to the 4WD control unit 9. The steering angle sensor 20 is configured to detect the steering state of a steering wheel, and transmit a steering angle signal to the 4WD control unit 9. The 4WD selector switch 22 is used to select either one of the 4WD or 2WD travel mode and allow a driver to select the 2WD mode when the 4WD mode is unnecessary. The 4WD selector switch 22 is configured to transmit a selection state signal to the 4WD control unit 9.

The ECCS control unit 21 is preferably a circuit configured to control an electronic throttle of the engine 11 and control both the output and speed of the engine 11 based on inputs of the throttle position signal (not shown) received from the accelerator pedal sensor 19 and an engine speed signal detected by an engine rotation sensor (not shown). The ECCS control unit 21 is configured to transmit the throttle position signal and the engine speed signal to the A/T control unit 24. Moreover, the ECCS control unit 21 is configured to transmit the engine speed signal and throttle position signal to the 4WD control unit 9.

The ABS control unit 23 is configured to determine whether the front wheels 10L and 10R and/or the rear wheels 1L and 1R are slipping based on the wheel speed signals received from the wheel speed sensors 8FL, 8FR, 8RL and 8RR coupled to the front wheels 10L and 10R and the rear wheels 1L and 1R, and transmit a slipping state signal to the 4WD control unit 9. The ABS control unit 23 is further configured to transmit the wheel speed signals for each of the front wheels 10L and 10R and the rear wheels 1L and 1R to the 4WD control unit 9.

The A/T control unit 24 is preferably a circuit for controlling the transmission 12 based on signals such as the throttle position signal, the engine speed signal, the wheel speed signal received from the wheel speed sensors 8FL and 8FR coupled to the front wheels 10L and 10R, a selection range position selected by the driver with the selecting lever, and other vehicle operation signals. The A/T control unit 24 is configured to transmit the shift position signal of the transmission 12 to the 4WD control unit 9.

The indicator lamp 31 is configured to display a warning signal if the 4WD control system is operating abnormally, and display whether the hybrid 4WD vehicle V is operating in the 4WD or 2WD travel mode.

In the first embodiment of the present invention, if the driver has selected the 4WD selector switch 22 to select the 4WD travel mode before the hybrid 4WD vehicle V is started, the 4WD control unit 9 is configured to place the inverter unit 7 in an electrically conducting state. Therefore, the inverters 7 are placed in a standby mode that enables the inverters 7L and 7R to drive the electric motors 4L and 4R, respectively, in response to control signals received from the 4WD control unit 9. In such case, the 4WD control unit 9 is configured to control the indicator lamp 31 to display that the 4WD travel mode has been selected.

Moreover, the 4WD control unit 9 is configured to monitor a charging status of the battery 17. If the battery 17 is insufficiently charged, the 4WD control unit 9 is configured to transmit a signal to the power generator 13 to start generation of power. Thus, the power generator 13 is driven by the engine 11 and generates electric power.

When the driver depresses the accelerator pedal, the ECCS control unit 21 is configured to adjust the electronic throttle. The A/T control unit 24 is configured to control the transmission 12 in accordance with the operation of the ECCS control unit 21, and drive the front wheels 10L and 10R by converting the output of the engine 11 into the target number of rotations and torque.

The 4WD control unit 9 is configured to compute the vehicle speed based on the wheel speed signals for each of the front wheels 10L and 10R and the rear wheels 1L and 1R as received from the ABS control unit 23. The 4WD control unit 9 is further configured to compute the difference in rotation between the inside and outside rear wheels 1L and 1R (or 1R and 1L) based on the vehicle speed, the throttle position, the shift position, and the steering angle, and compute a target drive torque for each of the left and right rear wheels 1L and 1R. Then, the 4WD control unit 9 is configured to transmit the control signals indicative of drive torques and direction of rotation to the inverters 7L and 7R.

The inverters 7L and 7R are configured to switch controlling of the DC current from the battery 17 or the power generator 13 and supply the drive current to the electric motors 4L and 4R based on the control signals received from the 4WD control unit 9. The signals from the rotation angle sensors 25L and 25R are preferably fed back to the 4WD control unit 9 to separately control the electric motors 4L and 4R such that each of the rear wheels 1L and 1R is provided with a corresponding target drive torque.

Figure 6:
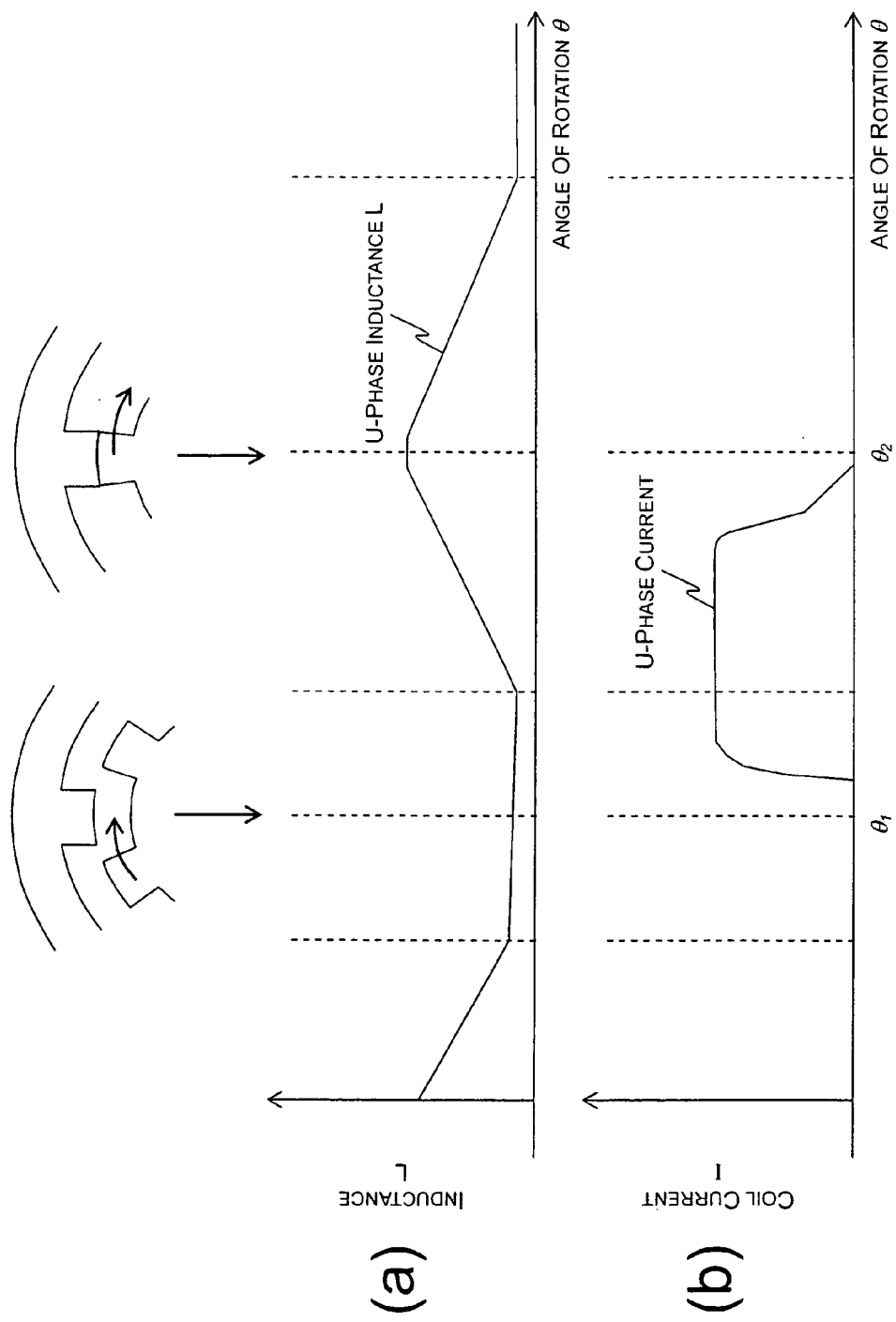
FIG. 6 is a simplified diagram illustrating a control of supplying drive current to the SR motor with respect to a rotation angle of a rotor, an inductance and a coil current in accordance with the first embodiment of the present invention.

The control of the DC current supplied when the electric motors 4L and 4R are driven is described with reference to FIG. 6, using the U-phase as an example. In FIG. 6, the change in inductance L of the U-phase coils 46b with respect to the angle of rotation θ is shown in a diagram (a) and the current I fed to the U-phase coils 46b as a function of the angle of rotation θ shown in a diagram (b).

The power supply or the current I to the U phase coils 46b are controlled as seen in the diagram of FIG. 6. More specifically, the current begins to flow at an angle of rotation $\theta_1$ where the salient poles 46a of the stator 46 are aligned opposite the center of the troughs between adjacent salient poles 45a of the rotor 45. As seen in the diagram (a) of FIG. 6, a maximum current is supplied between the angle of rotation $\theta_1$ and the angle of rotation $\theta_2$ when the salient poles 46a of the stator 46 are aligned opposite the salient poles 45a of the rotors so that a maximum inductive force is generated for the salient poles 45a of the rotors and salient poles 46a of the stators in a state of mutual attraction. Once the salient poles 46a of the stator 46 are aligned opposite the salient poles 45a of the rotor 45, the current I and inductive force are reduced to zero, thereby generating driving torque and preventing back torque (torque in an opposite direction) from being generated. The power supply of the V- and W-phase drive current is controlled in the substantially same manner as the U-phase drive current illustrated in FIG. 6.

Thus, the inverters 7L and 7R are configured to control the torque and the direction of rotation in the electric motors 4L and 4R. Accordingly, the inverters 7L and 7R, along with the electric motors 4L and 4R and the reduction gears 3L and 3R, are configured to distribute torque between the rear wheels 1L and 1R in the same manner as a conventional differential gear.

When the 4WD control unit 9 detects that the hybrid 4WD vehicle V is traveling at or above a prescribed speed (e.g., about 50 km/hr or more) the 4WD control unit 9 is configured to send a command to the inverters 7L and 7R to stop supplying power to the electric motors 4. Therefore, the rear wheels 1L and 1R are placed in a driven state in which the rear wheels 1L and 1R (i.e., the driven wheels) are driven by the forced rotation by the front wheels 1L and 1R, which are driven by the engine 11. The prescribed speed is set to about 50 km/hr so that the front wheels 10L and 10R (the engine-driven wheels) will not slip or skid on snow-covered roads or the like in the 2WD travel mode.

As mentioned above, the transmission gear ratio of the reduction gears 3L and 3R is preferably set to enable the electric motors 4L and 4R to rotate at about 10,000 rpm when the vehicle speed is about 50 km/hr. Therefore, the maximum speed of each of the electric motors 4L and 4R is about 40,000 rpm when the maximum vehicle speed is about 200 km/hr if the electric motors 4L and 4R were able to idle up to when the hybrid 4WD vehicle V is traveling at the maximum vehicle speed.

However, when the electric motors 4L and 4R are operating at a high speed (e.g., in excess of 10,000 rpm), an induced voltage generated by the coils 46b is increased. Therefore, the current will not be able to flow through the coils 46b unless an equivalent or higher voltage is supplied. Thus, in the first embodiment of the present invention is configured to stop supplying the current to the electric motors 4L and 4R when the electric motors 4L and 4R are operating at a high speed such as in excess of 10,000 rpm (a vehicle speed of 50 km/hr or more).

Moreover, as mentioned above, each of the ball bearings 44 of the electric motors 4L and 4R is preferably constituted as a silicon nitride ceramic ball bearing. Thus, each of the bearing balls 44a of the ball bearings has a relatively lower specific gravity, higher hardness, less thermal expansion, and a corrosion resistance that is remarkably higher than the ordinary bearing steel. For example, the silicon nitride ceramic bearing ball 44a of the present invention preferably has a specific gravity of about 3.2 while the ordinary bearing steel usually has a specific gravity of about 7.8. Also, the ceramic bearing ball 44a of the present invention preferably has a hardness of about 1500 HV while the ordinary bearing steel usually has a hardness of about 750 HV.

Since the bearing balls 44a has a relatively low specific gravity, which is one of the characteristics of such silicon nitride ceramic materials, the centrifugal force of the rolling elements (i.e., the ceramic bearing balls 44a in the present embodiment) is reduced and the temperature of the ball bearings 44 is prevented from increasing. Therefore, the working life of the ball bearings 44 used to support motor axle 43 that rotate at high speeds (i.e., about 10,000 to about 40,000 rpm) is improved. Moreover, since the ball bearings 44 has a relatively low thermal expansion, a temperature-induced variation of a space inside the ball bearings 44 is minimized, and vibration is prevented from occurring. Furthermore, an abrasion of the inner ring 44c and outer ring 44b, which is often a problem when the bearing balls 44a are made of bearing steel, is eliminated by using the ceramic bearing balls 44a.

The 4WD control unit 9 is configured to detect when the hybrid 4WD vehicle V is decelerating or braking based on signals received from the brake pedal sensor 18 and accelerator pedal sensor 19 by detecting if the brake pedal is depressed to initiate related actions or if the accelerator pedal is released to coast. When the 4WD control unit 9 determines the hybrid 4WD vehicle V is braking or decelerating when the driver has selected the 4WD travel mode and when the hybrid 4WD vehicle V is driving within a prescribed range of vehicle speeds, the 4WD control unit 9 is configured to send a command to the power generator 13 and inverters 7L and 7R to generate power so that the inverters 7L and 7R function as regenerative brakes along with the power generator 13 and electric motors 4L and 4R. The DC current thus generated by the regenerative brake is charged in the battery 17. The prescribed range of the vehicle speeds within which the electric motors 4L and 4R (i.e., the SR motors) are configured to function as regenerative brakes is preferably set to a range of vehicle speeds exceeding 50 km/hr which is about the maximum vehicle speed up to which the drive current is supplied to the electric motors 4L and 4R. When power is generated by the rotating force of the electric motors 4L and 4R, i.e., by the so-called regenerative torque, the power can be generated at high rotations that exceed the rotational drive speed. Regenerative energy is produced in proportion to the amount of energy supplied to the coils 46b. Therefore, if power sufficient for priming is supplied in order to excite the coils 46b, a constant braking torque corresponding to the amount of power supplied to the coils 46b can be produced and power can be generated even if the inverters 7L and 7R have a low withstand voltage, as described above.

Figure 7:
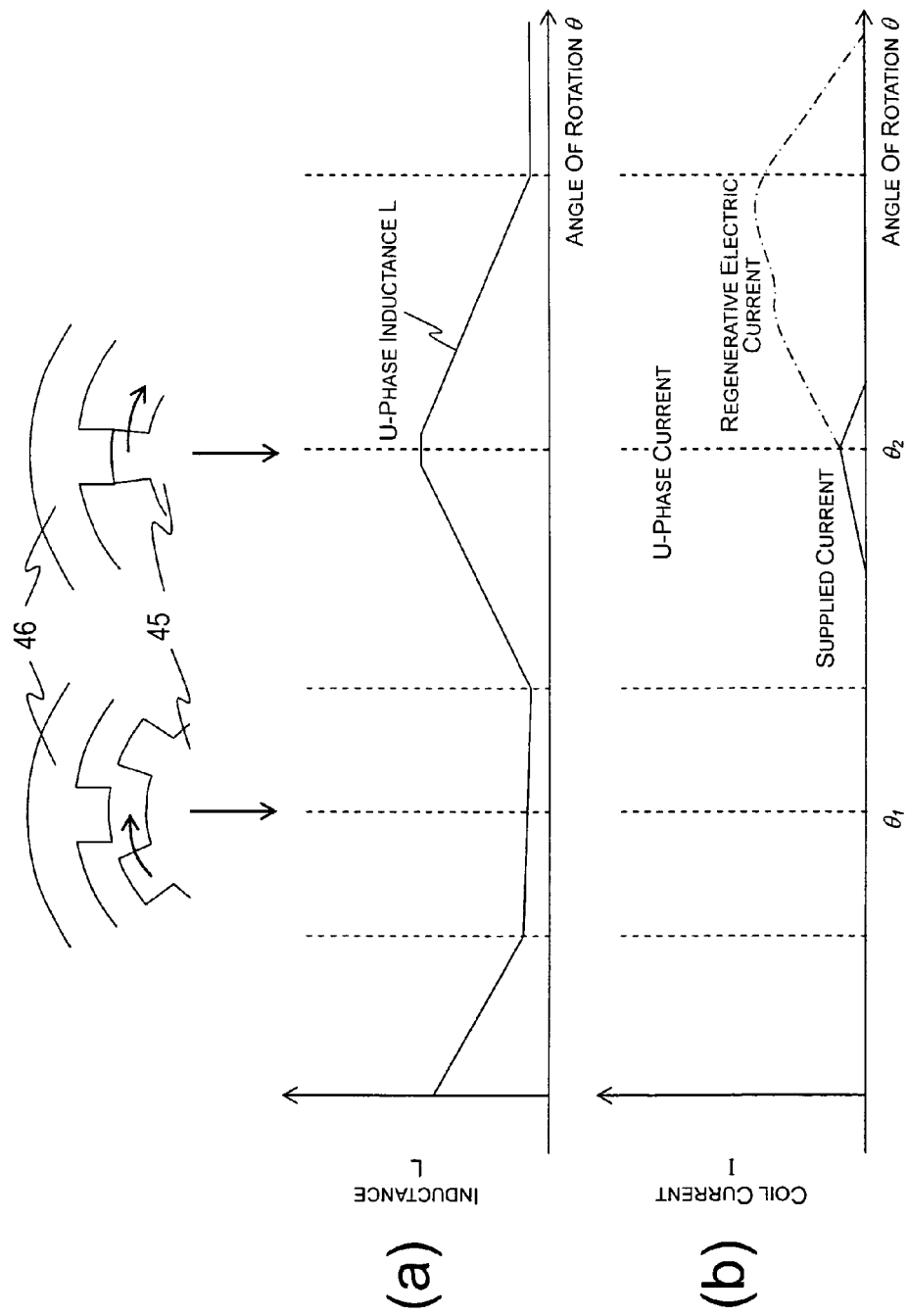
FIG. 7 is a simplified diagram illustrating a control of producing regenerative power by the SR motor with respect to the rotation angle of the rotor, the inductance and the coil current in accordance with the first embodiment of the present invention.

The control for supplying power generated when regenerative braking is performed will be explained with reference to FIG. 7. A diagram (a) of FIG. 7 shows the change in inductance L of the U-phase coils 46b with respect to the angle of rotation θ. A diagram (b) of FIG. 7 shows the current supplied to the U-phase coils 46b, and the regenerative electric current produced, as a function of the angle of rotation θ.

The electrical fields are produced in the coils 46b when the salient poles 45a of the rotor 45 and the salient poles 46a of the stator 46 are aligned opposite each other. These electrical fields create a back torque that acts to prevent the salient poles 45a of the rotor 45 and the salient 46a of the stator 46 from moving further apart, and generate regenerative power. Thus, the 4WD control unit 9 is configured to control the supply of electric current to the U-phase coils 46b so that the electrical fields in the coils 46b increase within a range that does not exceed the withstand voltage of the inverters 7L and 7R. Accordingly, the regenerative power is generated that yields a regenerative electric current as illustrated by a dotted line in the diagram (b) of FIG. 7. The 4WD control unit 9 is configured to control the supply of the V- and W-phase regenerative power in the substantially same manner as the supply of the U-phase regenerative power as illustrated in FIG. 7.

When the driver has selected the 2WD travel mode by using the 4WD selector switch 22 prior to the hybrid 4WD vehicle V is started, the 4WD control unit 9 is configured to place the inverter unit 7 including the inverters 7L and 7R in a non-electrically conducting state. In such case, the 4WD control unit 9 is configured to control the indicator lamp 31 to display that the 2WD mode has been selected. The hybrid 4WD vehicle V then functions as a conventional 2WD front drive vehicle.

The 4WD control unit 9 of the first embodiment preferably constitutes a driven wheel drive controller. The front wheels 10L and 10R in the first embodiment correspond to primary driving wheels and the rear wheels 1L and 1R correspond to the driven wheels.

As described above, in the first embodiment of the present invention basically comprises a 4WD system in which each of the rear wheels 1L and 1R that are not driven by the engine 11 is coupled to the drive unit comprising the brake discs 15L or 15R, the reduction gears 3L or 3R, and the electric motors 4L or 4R. The drive unit is substantially housed within the rims 2L or 2R of the left or right rear wheels 1L and 1R. The drive unit has neither an electromagnetic clutch nor a differential gear for the rear wheels 1L and 1R. Accordingly, the overall weight of the 4WD system can be reduced, and fuel efficiency is improved.

Moreover, the electric motors 4L and 4R utilize the SR motors that are not furnished with a permanent magnet. Accordingly no back torque will be produced by a magnetic field as long as no electrical power is supplied to the electric motors 4L and 4R. Therefore, only loss of energy due to forced rotation of the rear wheels 1L and 1R is caused by an inertia resulting from the weight of the rotors 45 during acceleration and deceleration and the friction resistance of the ball bearings 44. Therefore, the loss of energy due to forced rotation of the rear wheels 1L and 1R is kept very low As a result, there is no need for a clutch or the like to be used to disengage transmission between the rear wheels 1L and 1R and the electric motors 4L and 4R, respectively. Moreover, there is no need for a weak magnetic current to be passed through the electric motors 4L and 4R to reduce the back torque, i.e., the cogging torque, of the electric motors 4L and 4R.

In the first embodiment of the present invention, the ball bearings 44 of the electric motors 4L and 4R utilize the ceramic bearing balls 44a that are suited to high speeds of up to 200 km/hr, which is in excess of the range of vehicle speed (i.e., 0 to about 50 km/hr) permitted for the drive current to be supplied to the electric motors 4L and 4R. Therefore, when the rotors 45 of the electric motors 4L and 4R are rotated in accordance with the slave rotation of the rear wheels 1L and 1R, rapid forced rotation up to about 40,000 rpm can be externally induced.

In addition, the rotors 45 of the electric motors 4L and 4R (the SR motors) are preferably made lighter in weight than those of DC motors with armatures. Moreover, since the rotors 45 of the electric motors 4L and 4R have relatively rigid structures, the forced rotation in the electric motors 4L and 4R are possible up to the maximum speed of the hybrid 4WD vehicle V and any mechanical loss due to the centrifugal forces acting on the rotors 45 during high-speed operation can be eliminated.

When the SR motors are used as the electric motors 4L and 4R, the diameter of the rotors 45 can be made larger than in other type of electric motors, even though the electric motors 4L and 4R are capable of forced rotation at high speeds. As a result, a large amount of torque can be produced from the electric motors 4L and 4R that are compact enough to be housed within the rims 2L and 2R, respectively. Moreover, any friction caused by brush contact during idling such as that which occurs in DC motors is eliminated. Therefore, any adverse effect on fuel efficiency that accompanies the increased friction produced during periods of idling at high speeds can be minimized. Consequently, the drive apparatus having a relatively simple structure is obtained without having to provide an electromagnetic clutch to the reduction gears 3L and 3R.

In the first embodiment, the electric motors 4L and 4R are stopped when the vehicle speed reaches about 50 km/hr or higher. The reduction gear ratio of the reduction gears 3L and 3R are preferably set such that the speed of the electric motors is about 10,000 rpm when the vehicle speed is about 50 km/hr.

Generally, in order to drive the electric motors 4L and 4R at a high speed, a voltage that is higher than the induced voltage generated in the coils 46b of the electric motors 4L and 4R has to be impressed on the coils 46b. Thus, a power source having an appropriately higher voltage has to be used to impress the required voltage on the coils 46b. Accordingly, the withstand voltage of the inverters 7L and 7R has to be increased. Reducing the number of coil windings in the electric motors 4L and 4R is one possible alternative method that makes it possible to avoid substantially increasing the withstand voltage of the inverters 7L and 7R. However, the output current of the inverters 7L and 7R must be increased in such case in order to preserve the torque generated by the electric motors 4L and 4R during periods of low rotation. On the other hand, in the first embodiment of the present invention, the electric motors 4L and 4R are driven up to about 10,000 rpm. Therefore, the inverters 7L and 7R and electric motors 4L and 4R can be designed for use at lower voltages in comparison with designs of the inverters and electric motors in which electric motors are driven by the inverters up to even higher speeds. Therefore, in the first embodiment of the present invention, the number of coil windings in the electric motors 4L and 4R do not need to be reduced, and the output current of the inverters 7L and 7R can be lowered. Accordingly, the structure of the inverters 7L and 7R and electric motors 4L and 4R are simplified to achieve more compact, lightweight, and inexpensive structure.

Since the SR motors are used for the electric motors 4L and 4R, regenerative power is obtained by supplying electric power with a certain timing so that the priming current is supplied to the coils 46b within the withstand voltage of the inverters 7L and 7R, even when the number of rotations exceeds about 10,000 rpm which is the maximum speed of the electric motors 4L and 4R for controlling the supply of power required to drive the rear wheels 1L and 1R.

Moreover, each of the left and right rear wheels 1L and 1R is coupled to the electric motors 4L or 4R. Therefore, each of the electric motors 4L and 4R are configured to produce half the output generated by a single motor when the left and right wheels were provided with the single motor. Accordingly, the electric motors 4L and 4R can be made compact. Moreover, a compact configuration of the electric motors 4L and 4R is obtained also by having the drive unit (i.e., a single integrated unit comprising the electric motor 4L or 4R, the reduction gear 3L or 3R, and the brake disc 15L or 15R) substantially housed within the rim 2L or 2R. Therefore, the need for the electric motor 4L or 4R and reduction gear 3L or 3R to occupy the region underneath the rear portion of the hybrid 4WD vehicle V interior is eliminated. Moreover, the comfort of passengers in the rear seats is increased, and the capacity of the trunk does not have to be reduced.

Accordingly, the drive units for the rear wheels 1L and 1R are made to a compact configuration. Therefore, the tasks required to install the drive units for the rear wheels 1L and 1R on the axle for the rear wheels 1L and 1R can be performed in the same manner as the brake discs are mounted on the axle for the rear wheels when a front-drive 2WD vehicle is assembled. Therefore, in the present invention, there is less work to be performed in the assembly process comparing with a conventional hybrid 4WD vehicle or a conventional 4WD vehicle. Thus, manufacturing costs can be reduced.

When the driver has selected the 4WD travel mode before the hybrid 4WD vehicle V is started, the hybrid 4WD vehicle V is configured and arranged to function as a 4WD vehicle at speeds ranging from a standing start to about 50 km/hr. Thus, the hybrid 4WD vehicle V is configured to reduce possibility of spinning when the vehicle starts off as a result of a suspension-induced temporary reduction in the grip of the front wheels 10L and 10R, which are the wheels driven by the engine 11. Since the rear wheels 1L and 1R are driven by the electric motors 4L and 4R, the wheel spin is alleviated, which allows the hybrid 4WD vehicle V to start off in a smooth manner.

Figure 8:
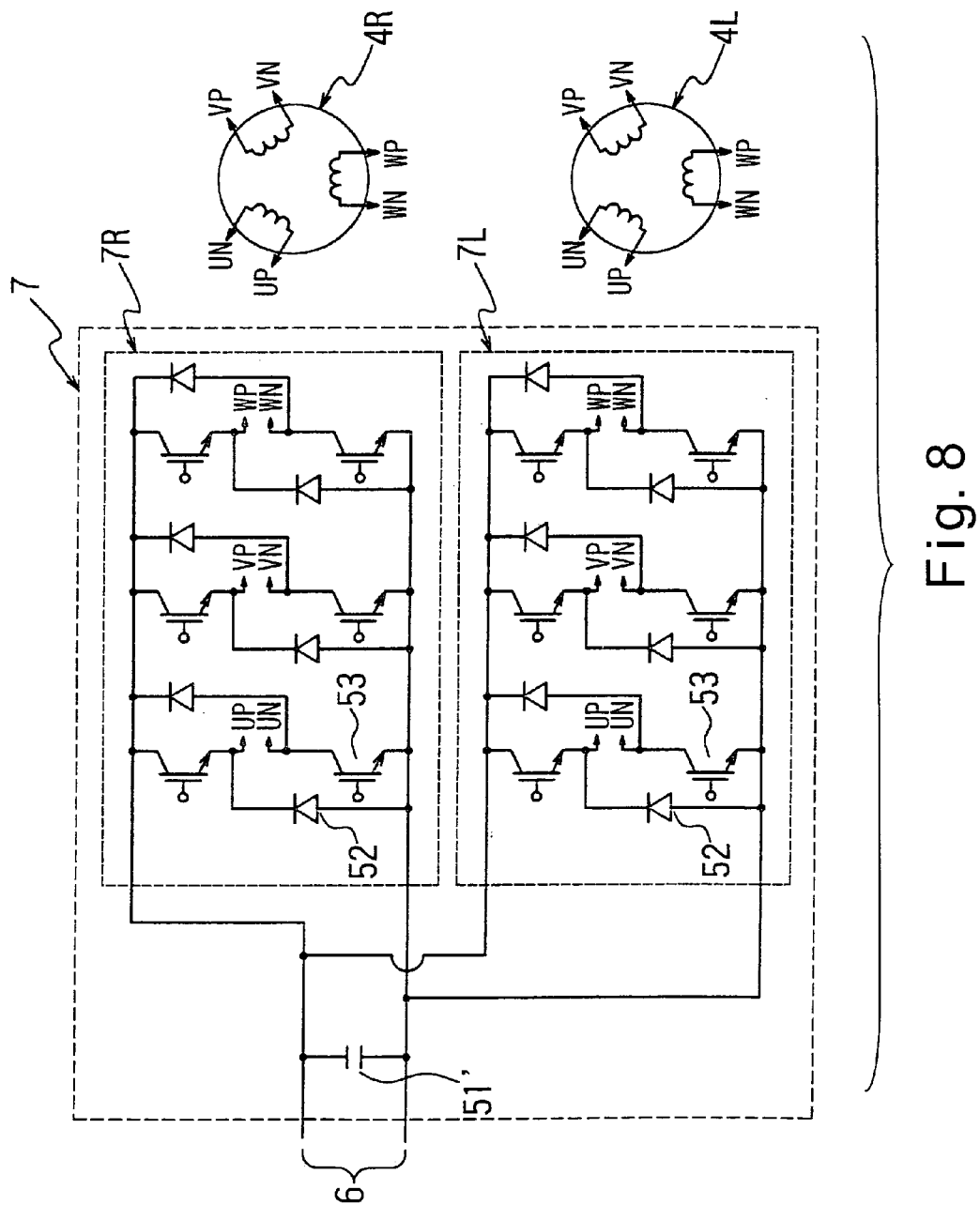
FIG. 8 is a schematic diagram of circuits included in the inverter unit utilized in the drive apparatus in accordance with the first embodiment of the present invention.

The inverters 7L and 7R of the inverter unit 7 can be constituted with an alternative structure as shown in FIG. 8. The alternative structure of the inverter unit 7 includes an input capacitor 51' that is shared between the inverters 7L and 7R, instead of two input capacitors 51 for each of the inverters 7L and 7R as shown in FIG. 5. Since the input capacitor 51' is shared between the inverters 7L and 7R in this alternative structure of the inverter unit 7, number of components can be reduced. Accordingly, the overall configuration of the inverter unit 7 can be made compact and lightweight.

Moreover, the structure of the SR motors used as the electric motors 4L and 4R is not limited to an inner rotor type as illustrated in FIGS. 3 and 4. Rather, an outer rotor type of the electric motor 4L and 4R can also be utilized.

According to first embodiment of the present invention, a differential gear between the rear wheels 1L and 1R can be eliminated. The weight of the hybrid 4WD vehicle V can be reduced because of a configuration wherein the drive unit comprises the electric motor 4L or 4R with no permanent magnet and the reduction gear 3L or 3R is coupled to each of the left and right driven wheels (the rear wheels 1L and 1R). The electric motors 4L and 4R are configured to drive the rear wheels 1L and 1R via the reduction gears 3L and 3R, respectively.

Also, since the electric motors 4L and 4R of the rear wheels 1L and 1R do not have a permanent magnet, there is no cogging torque and the friction is minimal even when the electric motors 4L and 4R idle due to the driven rotation of the rear wheels 1L and 1R when the electric motors 4L and 4R are not being driven. As a result, fuel efficiency is improved by reducing the weight of the hybrid 4WD vehicle V and minimizing friction.

Second Embodiment

Figure 9:
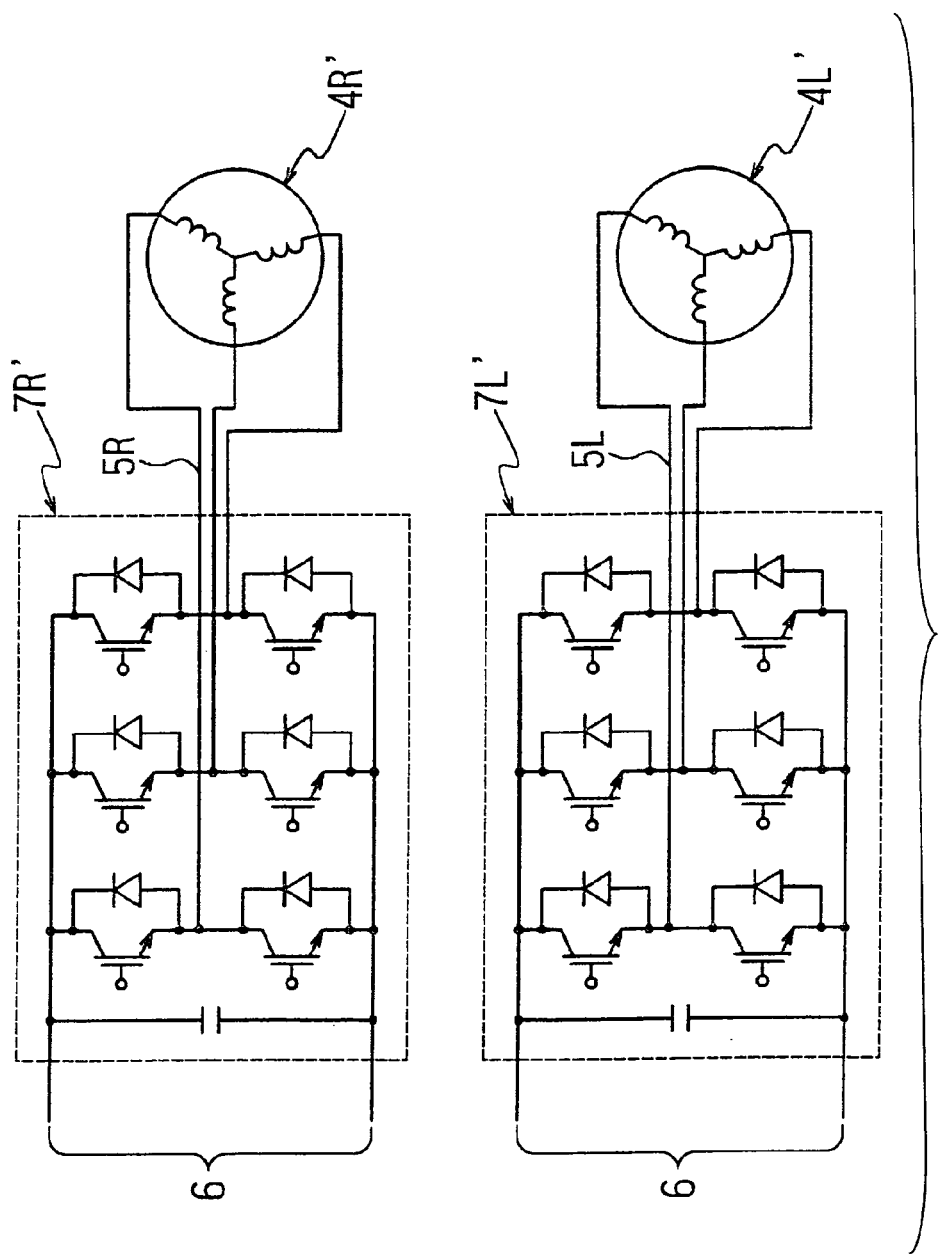
FIG. 9 is a schematic diagram of circuits included in an inverter unit utilized in a drive apparatus in accordance with a second embodiment of the present invention.

Referring now to FIG. 9, a drive apparatus in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a prime (').

Basically, the drive apparatus of the second embodiment is identical to the drive apparatus of the first embodiment, except that a pair of electric motors 4L' and 4R' utilize three-phase induction motors instead of the SR motors as in the first embodiment, and a pair of inverters 7L' and 7R' are substituted for the inverters 7L and 7R as seen in FIG. 9. More specifically, each of the three-phase induction motors 4L' and 4R' (i.e., the three-phase induction motors) of the second embodiment is provided with a rotation speed sensor while the three-phase induction motors 4L and 4R (the SR motors) of the first embodiment are provided with the rotation angle sensors 25L and 25R, respectively. The three-phase induction motors are conventional components that are well known in the art. Since the three-phase induction motors are well known in the art, the precise structures or operation of the three-phase induction motors will not be discussed or illustrated in detail herein. Moreover, as seen in FIG. 9, each of the inverters 7L' and 7R' is provided with a two-phase bridge inverter circuit and configured and arranged to supply electrical power to corresponding one of the three-phase induction motors 4L' and 4R' and control the rotation of the corresponding one of the three-phase induction motors 4L' and 4R'.

The other structures and configurations of the drive apparatus of the second embodiment are basically identical to those of the first embodiment shown in FIGS. 1 and 2. In other words, a pair of integrated left and right drive units comprising the three-phase induction motors 4L' and 4R', the reduction gears 3L and 3R and the brake discs 15L and 15R, respectively, are housed within the rims 2L and 2R. Thus, the compact configuration of the drive unit for the rear wheels 1L and 1R can be obtained. Moreover, the inverter unit 7 includes the inverters 7L' and 7R' individually used for the left and right drive units for the left and right rear wheels 1L and 1R respectively. The inverters 7L' and 7R' are preferably configured and arranged to drive the three-phase induction motors 4L' and 4R' up to about 10,000 rpm.

Accordingly, the operations and the effects of the second embodiment are basically the same as the first embodiment. Generally, rotors in the three-phase induction motors 4L' and 4R' are made lighter than those in conventional DC motors, and the rigid structure of the rotors in the three-phase induction motors also enables the forced rotation of the three-phase induction motors 4L' and 4R' to extend up to the maximum speed of the hybrid 4WD vehicle V.

Moreover, since the rotors of the three-phase induction motors are shaped cylindrically, the drag-related loss can be minimized and any friction caused by brush contact during idling, such as that which occurs in the conventional DC motors, is accordingly eliminated. Therefore, any adverse effect on fuel efficiency that accompanies the increased friction produced during periods of idling at high speeds can be minimized.

Consequently, a drive apparatus having a relatively simple structure can be obtained without requiring a differential gear, or having to provide an electromagnetic clutch to the reduction gears 3L and 3R. Thus, improved fuel efficiency can be obtained. Moreover, the comfort of passengers is also increased in the rear seats of the hybrid 4WD vehicle V, and the need to reduce the capacity of the trunk of the hybrid 4WD vehicle V is avoided. Moreover, the workload required for the assembly process of the hybrid 4WD vehicle V can be reduced, which contributes to lower manufacturing costs.

The drive apparatus of the second embodiment is preferably configured and arranged such that the three-phase induction motors 4L' and 4R' are preferably driven up to about 10,000 rpm. Therefore, the inverters 7L' and 7R' and the three-phase induction motors 4L' and 4R' can be designed for use at low voltages, which allows the structures and configuration of the inverters 7L' and 7R' and the three-phase induction motors 4L' and 4R' to be simplified. Thus, the weight and manufacturing costs of the hybrid 4WD vehicle V can be reduced.

Third Embodiment

Figure 10:
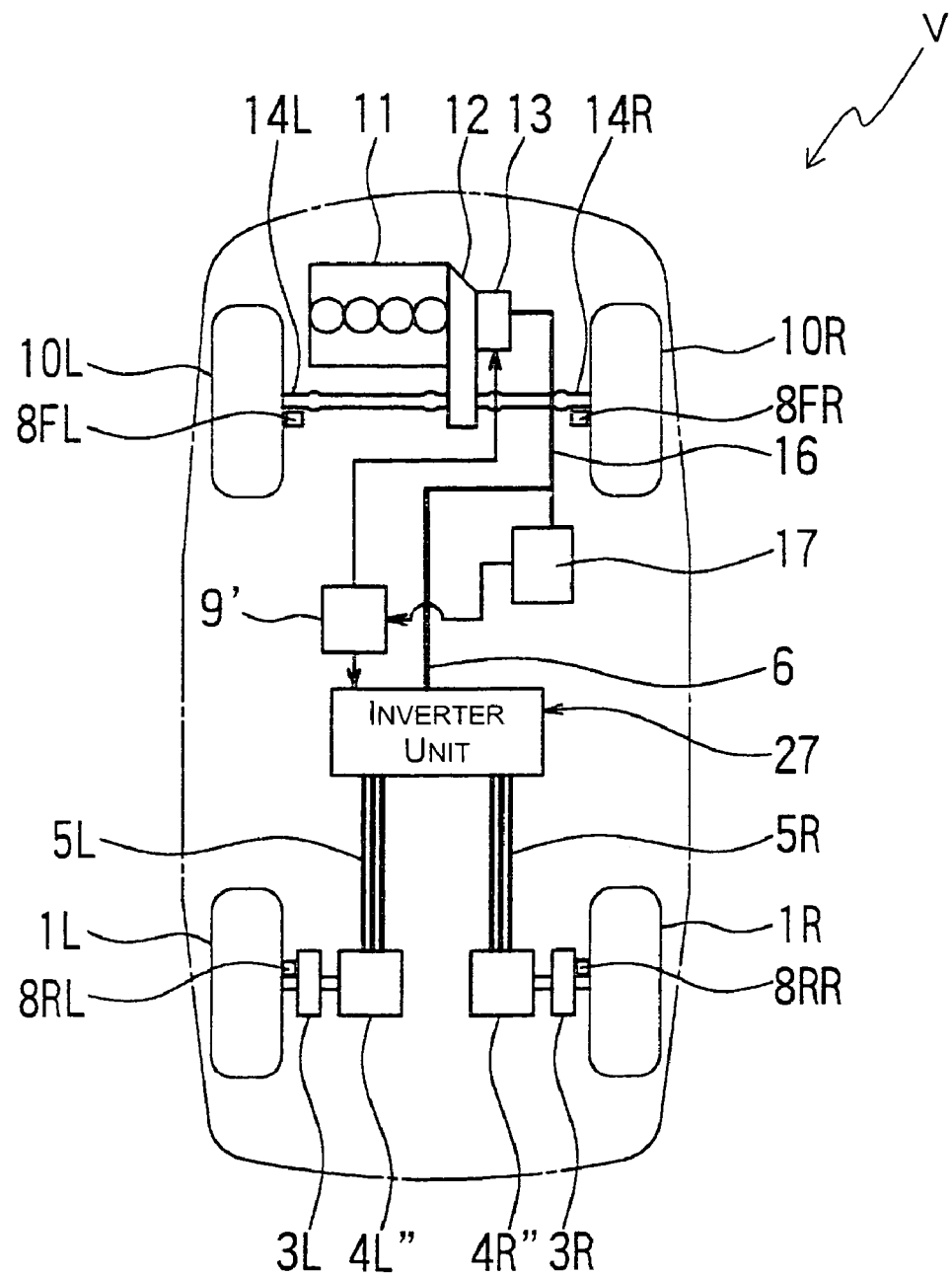
FIG. 10 is a simplified schematic view of an overall drive control system of a hybrid 4WD vehicle equipped with a drive apparatus in accordance with a third embodiment of the present invention.
Figure 11:
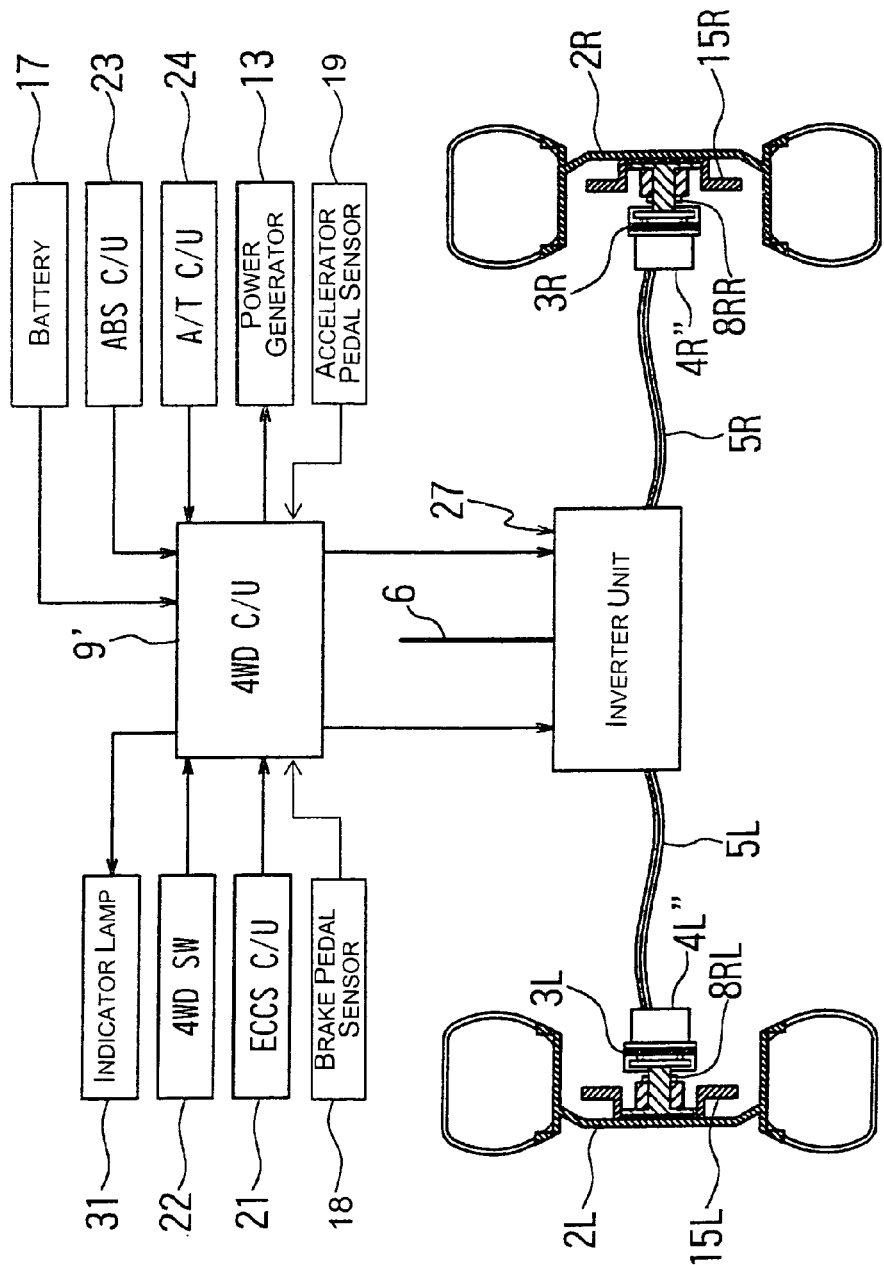
FIG. 11 is a schematic view of the drive apparatus illustrated in FIG. 10 including a drive control system of left and right rear wheels of the hybrid 4WD vehicle in accordance with the third embodiment of the present invention.
Figure 12:
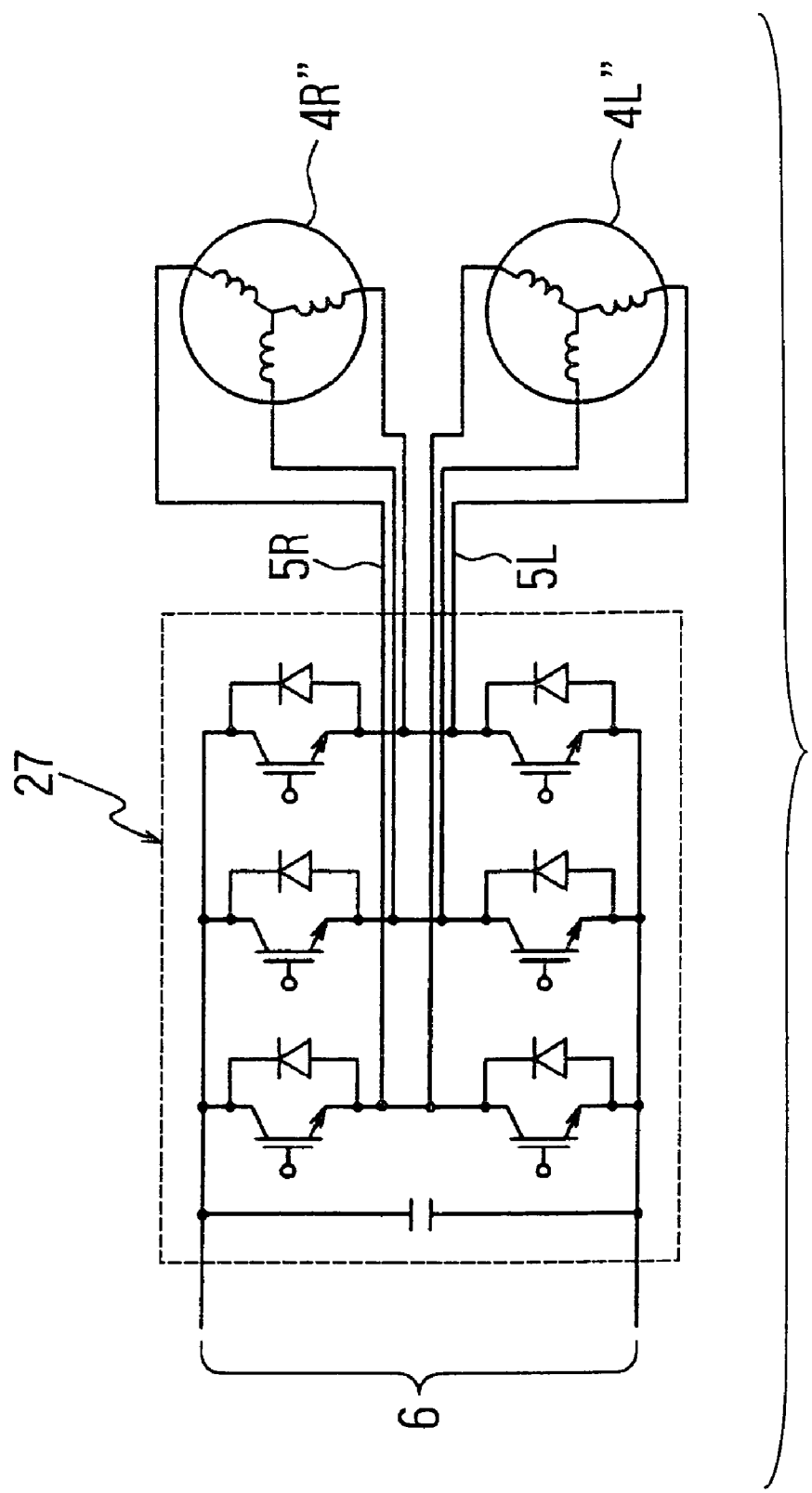
FIG. 12 is a schematic diagram of a circuit included in an inverter unit utilized in the drive apparatus in accordance with the third embodiment of the present invention.

Referring now to FIGS. 10 to 12, a drive apparatus in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a single prime (') or a double prime (").

FIG. 10 is a simplified schematic view of an overall drive control system of the hybrid 4WD vehicle V equipped with the drive apparatus of the third embodiment. FIG. 11 is a schematic view of the drive apparatus illustrated in FIG. 10 including a drive control system of a left rear wheel 1L and a right rear wheel 1R of the hybrid 4WD vehicle V. FIG. 12 is a schematic diagram of a circuit included in an inverter unit 27 utilized in the drive apparatus of the third embodiment.

First difference between the third embodiment and the first embodiment is that the electric motors 4L" and 4R" utilize three-phase induction motors without rotation speed sensors instead of the SR motors with the rotation speed sensors 25L and 25R as in the first embodiment.

Moreover, the inverter unit 27 is constituted as a conventional bridge inverter circuit for supplying electrical power to the three-phase induction motors 4L" and 4R" and controlling the rotation of the three-phase induction motors 4L" and 4R" as shown in FIG. 12. The three-phase induction motors 4L" and 4R" are connected to the inverter unit 27 in parallel using the power cable 5L and 5R, respectively.

Since the three-phase induction motors 4L" and 4R" do not include rotation speed sensors, the signals of the wheel rotation speed sensors 8RL and 8RR coupled to the rear wheels 1L and 1R from the ABS control unit 23 to a 4WD control unit 9' are used to be substituted with the motor speed signals to the inverter unit 27 that are used for the feedback control of the speed of the three-phase induction motors 4L" and 4R" by the 4WD control unit 9'. Also, the 4WD control unit 9' is not configured to receive input signals from a steering angle sensor.

The other structures and configurations of the third embodiment are the same as those of the first embodiment. The operation and the control of the drive apparatus of the third embodiment will now be described, with attention being focused on aspects that differ from the first embodiment.

In the third embodiment, the numbers of rotations of the three-phase induction motors 4L" and 4R" are determined by the inverter unit 27 based on the numbers of rotations of the rear wheels 1L and 1R with respect to the transmission gear ratio of the reduction gears 3L and 3R. An average number of rotations of the three-phase induction motors 4L" and 4R" is set as the number of rotations used for the feedback control of the inverter unit 27.

In the third embodiment, the inverter unit 27 includes only one circuit that drives both of the left and right three-phase induction motors 4L" and 4R" using the same drive frequency.

The 4WD control unit 9' is configured to compute the vehicle speed based on the wheel speed signals for the front wheels 10L and 10R and the rear wheels 1L and 1R as received from the ABS control unit 23. The 4WD control unit 9' is further configured to compute the target drive torque for the rear wheels 1L and 1R based on the vehicle speed, throttle position, and shift position. Then the 4WD control unit 9' is configured to transmit control signals for drive torque and direction of rotation of the three-phase induction motors 4L" and 4R" to the inverter unit 27.

The inverter unit 27 is configured and arranged to convert the DC current received from the battery 17 or power generator 13 into the required three-phase AC current based on the control signals received from the 4WD control unit 9', and drive the three-phase induction motors 4L" and 4R".

The torque of each of the three-phase induction motors 4L" and 4R" is substantially proportional to a spinning frequency, i.e., a difference between the drive frequency of the inverter unit 27 and a rotation frequency of the rotor of the induction motors 4L" or 4R" when the rotation speed of the three phase induction motors 4L" or 4R" is between the synchronous rotation speed and the rotation speed corresponding to a maximum torque. When one of the left and right rear wheels 1L and 1R slips on an icy road and begins to rotate at high speed, the slipping wheel rotates substantially synchronously with the drive frequency of the inverter unit 27 and the torque of the slipping wheel 1L or 1R will be decreased because the inverter unit 27 is configured and arranged to drive the three-phase induction motors 4L" and 4R" at the frequency of the average number of rotations that is substantially corresponding to the vehicle speed. On the other hand, the three-phase induction motors 4L" or 4R" of the rear wheels that are not idling or slipping (i.e., non-slipping wheel) holds the road surface, and a large amount of torque will be produced because the spinning frequency of the three-phase induction motors 4L" or 4R" of the non-slipping wheel 1L or 1R will be greater than that of the three-phase induction motors 4L" or 4R" of the slipping wheel 1L or 1R. Thus, a drive power will be generated in the three-phase induction motors 4L" or 4R" of the non-slipping wheel 1L or 1R. Consequently, the drive power produced by the non-slipping wheel 1L or 1R enables the hybrid 4WD vehicle V to be controllably driven on the icy surface. In other words, the drive apparatus of the third embodiment is configured to provide substantially the same effects on the slipping wheel 1L and 1R as a conventional limited-slip differential, which is used with conventional differential gears for slipping wheels.

Therefore, in the third embodiment of the present invention, the inverter unit 27 can be constituted with a single simple structure with an enlarged current capacity as shown in FIG. 12, without having two inverters for each of the left and right rear wheels 1L and 1R as in the first and second embodiments.

Since the three-phase induction motors 4L" and 4R" are driven in parallel by the inverter unit 27 with a single circuit, the inverter unit 27 is enlarged as compared to the inverter unit 7 including the inverters 7L' and 7R' of the second embodiment that are configured to separately drive one of the three-phase induction motor 4L' and 4R'. However, the overall structure and configuration of the inverter unit 27 can be made more compact than the inverter unit 7' including two inverters 7L' and 7R'. Therefore, costs of manufacturing of the hybrid 4WD vehicle V can be reduced in the third embodiment than when two inverters are provided as in the first or second embodiment.

Moreover, in the third embodiment of the present invention, the average value of the number of rotations obtained based on the signals from the wheel speed sensors 8RL and 8RR are used by the inverter unit 27 to control the number of rotations of the three-phase induction motors 4". Therefore, the three-phase induction motors 4L" and 4R" do not need to be provided with rotation speed sensors, and thus, costs can be reduced.

In the first, second and third embodiments of the present invention, the 4WD control units 9 or 9' is configured so that the electric motors 4L and 4L, 4L' and 4L', or 4L" and 4L" drive the rear wheels 1L and 1R up to a vehicle speed of about 50 km/hr when the 4WD travel mode is selected. Alternatively, the first, second and third embodiments can be configured and arranged to operate in the 4WD travel mode when wheel spin has been detected in the front wheel 10L and/or 10R, and in the 2WD travel mode when no wheel spin has been detected, based on the determination of the wheel spin state received from the ABS control unit 23. In such case, the target torque required to drive the electric motors 4L and 4R (the SR motors), 4L' and 4R', or 4L" and 4R" (the three-phase induction motors) is obtained by controlling the inverter unit 7, 7' or 27 and the amount of power generated by the power generator 13, according to calculations of the optimal torque required to drive the rear wheels 1L and 1R in 4WD travel mode.

Accordingly, using a limited 4WD drive can prevent decreased fuel efficiency caused by the loss of heat generated by inverter unit 7, 7' or 27 and electric motors 4L and 4R (the SR motors), 4L' and 4R', or 4L" and 4R" (the three-phase induction motors) in situations where the 4WD drive mode has been employed when the 2WD mode would be sufficient.

Above descriptions of the present invention have been provided according to the preferred embodiments and alternative embodiments wherein the engine 11 is housed in the anterior region of the hybrid 4WD vehicle V and the engine 11 drives the front wheels 10L and 10R, which are the primary drive wheels. However, it will be apparent to those skilled in the art from this disclosure that the present invention can also be utilized in circumstances where an engine is housed in a different location from that specified in the above explained preferred embodiments, or where primary drive wheels that are driven by an engine are positioned in a different location from that specified in the examples. For example, the present invention can be adapted in a vehicle in which the primary drive wheels are a pair of rear wheels, and the electric motors are used to drive a pair of front wheels. Moreover, it will be apparent to those skilled in the art from this disclosure that the present invention can be adapted to a vehicle in which an electric motor is used as a power train that drives the primary drive wheels instead of an engine.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-105647. The entire disclosure of Japanese Patent Application No. 2003-105647 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A drive apparatus for a vehicle comprising:
   a first drive unit including at least a first non-permanent magnet electric motor configured and arranged to drive a first wheel, and a first reduction gear operatively coupled to the first non-permanent magnet electric motor to reduce speed of the first non-permanent magnet electric motor;
   a second drive unit including at least a second non-permanent magnet electric motor configured and arranged to drive a second wheel disposed on an opposite side of the vehicle from the first wheel, and a second reduction gear operatively coupled to the second non-permanent magnet electric motor to reduce speed of the second non-permanent magnet electric motor;

first and second inverters configured and arranged to supply electric power separately to the first and second non-permanent magnet electric motors, respectively; and a driven wheel drive controller configured to control the first and second inverters to separately control a torque of each of the first and second non-permanent magnet electric motors, the driven wheel drive controller being further configured to control the first and second inverters to stop flows of drive currents to the first and second non-permanent magnet electric motors when a vehicle speed is equal to or greater than a prescribed vehicle speed.

2. The drive apparatus according to claim 1, wherein the first and second drive units are housed substantially within first and second rims of the first and second wheels, respectively.

3. The drive apparatus according to claim 1, wherein the first and second inverters are further configured and arranged to share an input capacitor.

4. The drive apparatus according to claim 1, further comprising a wheel speed sensor unit configured and arranged to detect speed of the first and second wheels, and the driven wheel drive controller being configured to determine drive frequency of each of the first and second inverters based on the speed of the first and second wheels.

5. The drive apparatus according to claim 1, wherein the first and second non-permanent magnet electric motors are switched reluctance motors.

6. The drive apparatus according to claim 1, wherein the first and second non-permanent magnet electric motors are induction motors.

7. The drive apparatus according to claim 1, wherein each of the first and second non-permanent magnet electric motors includes a ball bearing unit having a maximum permitted rotation speed that is greater than a maximum drive rotation speed of each of the first and second non-permanent magnet electric motors that corresponds to a prescribed vehicle speed for stopping electric conduction to each of the first and second non-permanent magnet electric motors.

8. The drive apparatus according to claim 7, wherein the ball bearing unit of each of the first and second non-permanent magnet electric motors is a ceramic ball bearing.

9. The drive apparatus according to claim 5, wherein the driven wheel drive controller is further configured to stop supply of drive currents from the first and second inverters to the first and second non-permanent magnet electric motors, respectively, and allow flows of regenerative electric currents when a vehicle speed is equal to or greater than a prescribed vehicle speed.

10. The drive apparatus according to claim 1, further comprising a power source configured and arranged to drive third and fourth wheels, the driven wheel drive controller being further configured to selectively switch between a four wheel drive mode and a two wheel drive mode.

11. The drive apparatus according to claim 10, wherein the power source is an internal combustion engine.

12. The drive apparatus according to claim 11, further comprising a generator mechanically coupled to the internal combustion engine and electrically coupled to the first and second non-permanent magnet electric motors.

13. A drive apparatus for a vehicle including a pair of primary drive wheels driven by a power train and a pair of driven wheels, comprising non-permanent magnet electric motor means for independently and separately driving first and second wheels of the driven wheels;

gear reduction means operatively coupled to the non-permanent magnet electric motor means, for independently and separately reducing speed of the non-permanent magnet electric motor means;

first and second electrical power supplying means for supplying electric power separately to the non-permanent magnet electric motor means for independently and separately driving the first and second wheels of the driven wheels; and a driven wheel drive controlling means for controlling the first and second electrical power supplying means for separately controlling a torque of the non-permanent magnet electric motor means, the driven wheel drive controlling means further including a function for controlling the first and second electrical power supplying means to stop flows of drive currents to the non-permanent magnet electric motor means when a vehicle speed is equal to or greater than a prescribed vehicle speed.

* * * * *